US010986962B2

(12) United States Patent
Fulp et al.

(10) Patent No.: US 10,986,962 B2
(45) Date of Patent: *Apr. 27, 2021

(54) FIRETABLE, ACCESSORIES AND METHOD OF COOKING THEREON

(71) Applicant: Firetainment, Inc., Orlando, FL (US)

(72) Inventors: Kevin Fulp, Longwood, FL (US); William Shawn Clark, Apopka, FL (US)

(73) Assignee: Firetainment, Inc., Orlando, FL (US)

( * ) Notice: Subject to any disclaimer, the term of this patent is extended or adjusted under 35 U.S.C. 154(b) by 43 days.

This patent is subject to a terminal disclaimer.

(21) Appl. No.: 16/392,215

(22) Filed: Apr. 23, 2019

(65) Prior Publication Data

US 2019/0246838 A1 Aug. 15, 2019

Related U.S. Application Data

(63) Continuation of application No. 13/754,777, filed on Jan. 30, 2013, now Pat. No. 10,264,920.

(60) Provisional application No. 61/616,581, filed on Mar. 28, 2012.

(51) Int. Cl.
*A47J 37/07* (2006.01)
(52) U.S. Cl.
CPC .................. *A47J 37/0781* (2013.01)
(58) Field of Classification Search
CPC .................................................. A47J 37/0781
USPC ....................................... 126/25 R, 29, 25 A
See application file for complete search history.

(56) References Cited

U.S. PATENT DOCUMENTS

| | | | |
|---|---|---|---|
| 1,238,142 A | 8/1917 | Hitchcock | |
| 2,604,884 A | 7/1952 | Walker | |
| 3,013,550 A | 12/1961 | Murchie | |
| 4,023,474 A | 5/1977 | Dixon | |
| 4,433,671 A | 2/1984 | Deamicis | |
| 4,502,460 A | 3/1985 | Kelz | |
| 4,548,193 A | 10/1985 | Marogil | |
| 4,624,238 A | 11/1986 | Hait | |
| 4,732,138 A | 3/1988 | Vos | |
| 4,884,551 A | 12/1989 | Hait | |
| 4,909,235 A | 3/1990 | Boetcker | |
| 5,025,715 A | 6/1991 | Sir | |
| 5,103,799 A | 4/1992 | Atanasio | |
| 5,297,534 A | 3/1994 | Louden | |
| 5,406,931 A | 4/1995 | Montgomery | |
| 5,495,845 A | 3/1996 | Hait | |
| 5,868,128 A | 2/1999 | Omar | |
| 5,931,148 A | 8/1999 | Freeman | |
| 5,992,407 A | 11/1999 | Tsai | |
| 6,386,192 B1 | 5/2002 | Weber | |
| 6,640,797 B1 | 11/2003 | Magers | |
| 6,719,250 B2 | 4/2004 | Dunkin | |
| 6,895,958 B1 | 5/2005 | Komosky | |
| 7,063,006 B1 | 6/2006 | Spehle et al. | |
| 10,264,920 B2 * | 4/2019 | Fulp ................... | A47J 37/0781 |

(Continued)

*Primary Examiner* — Vivek K Shirsat
(74) *Attorney, Agent, or Firm* — Michael L. Leetzow, P.A.

(57) ABSTRACT

A fire table provides an aesthetic table surface while allowing for cooking over the fire using a removable cooking mount. The removable cooking mount is placed in a pan in an opening in the top of the fire table. The pan has a filler material to hide the burner assembly and acts to secure the removable cooking mount. A lazy susan can be used to cover the opening in the fire table when not in use for aesthetic and functional purposes.

9 Claims, 8 Drawing Sheets

(56) References Cited

U.S. PATENT DOCUMENTS

| | | |
|---|---|---|
| 2005/0109331 A1 | 5/2005 | Chao |
| 2005/0115556 A1 | 6/2005 | Carson et al. |
| 2006/0054160 A1 | 3/2006 | Borowske et al. |
| 2008/0223845 A1 | 9/2008 | Garr |
| 2008/0308645 A1 | 12/2008 | Presley et al. |
| 2011/0162634 A1 | 7/2011 | Richard |
| 2013/0081609 A1 | 4/2013 | Dhuper et al. |

* cited by examiner

US 10,986,962 B2

FIRETABLE, ACCESSORIES AND METHOD OF COOKING THEREON

This application claims priority under 35 U.S.C. § 119 (e) to provisional application No. 61/616,581, filed on Mar. 28, 2012, and to U.S. Pat. No. 10,624,920, filed on Jan. 39, 2013, under 35 U.S.C. § 120, both of which are hereby incorporated by reference in their entirety.

BACKGROUND OF THE INVENTION

Field of the Invention

Fire tables are a relatively recent addition to the home landscape and back yard gathering place. There have been other containers in which homeowners have been able to build a fire to sit around: chimineas, fire pits dug in the ground, outdoor fireplaces, etc. While these may work in specific situations, they do not allow a family to gather around them to talk, share, and even have a meal. And once the fire goes out, they can not be used for anything else and are usually an eyesore. Thus, a place is needed where people can have an outdoor fire, gather and be able to enjoy family and friends and use the facilities even after the fire has gone out.

SUMMARY OF THE INVENTION

The present invention is directed to a fire table adapted to be used for cooking as well as for heat and aesthetics that includes a base defining a storage space therein, a top mounted to and covering at least a portion of the base; the top having an upper surface and an opening therein and in communication with the storage space within the base, a pan disposed within the opening in the top, the pan configured to hold a burner and filler material, and a removable cooking mount, the removable cooking mount configured to be disposed within the pan, the removable cooking mount having four sides, each of the four sides having at least one opening therein to allow air to pass from outside the removable cooking mount to fuel a fire within the pan, and openings in a top side and bottom side for access to the fire for cooking elements placed on the top side of the removable cooking mount.

In some embodiments, the fire table includes a lazy susan, the lazy susan capable of being disposed in and covering at least a portion of the filler material when the fire table is being used as a table.

In some embodiments, the cooking elements include at least one of the elements selected from the group of a griddle, a dutch oven, a wok and a salt slab.

In some embodiments, the removable cooking mount is configured to be disposed within the filler material in the pan.

In another aspect, the invention is directed to a cooking set for cooking edible food over an open flame in an interior portion of a table that includes a removable cooking mount, the removable cooking mount configured to be disposed within the inner portion of the table, the removable cooking mount having four sides, each of the four sides being connected to an adjacent side and each side having at least one opening therein to allow air to pass from outside the removable cooking mount to fuel a fire therein, and openings in a top side and bottom side thereof, and at least one cooking element to be supported by the top portions of the each of the sides of the removable cooking mount and above the opening in the top side of the removable cooking mount, the at least one cooking element includes at least one of the elements selected from the group of a griddle, a dutch oven, a wok and a salt slab.

Additional features and advantages of the invention will be set forth in the detailed description which follows and, in part, will be readily apparent to those skilled in the art from that description or recognized by practicing the invention as described herein, including the detailed description, the claims, and the appended drawings.

It is to be understood that both the foregoing general description and the following detailed description of the present embodiments of the invention are intended to provide an overview or framework for understanding the nature and character of the invention as it is claimed. The accompanying drawings are included to provide a further understanding of the invention and are incorporated into and constitute a part of this specification. The drawings illustrate various embodiments of the invention and, together with the description, serve to explain the principles and operations of the invention.

DETAILED DESCRIPTION OF THE PREFERRED EMBODIMENTS

Figure 1:
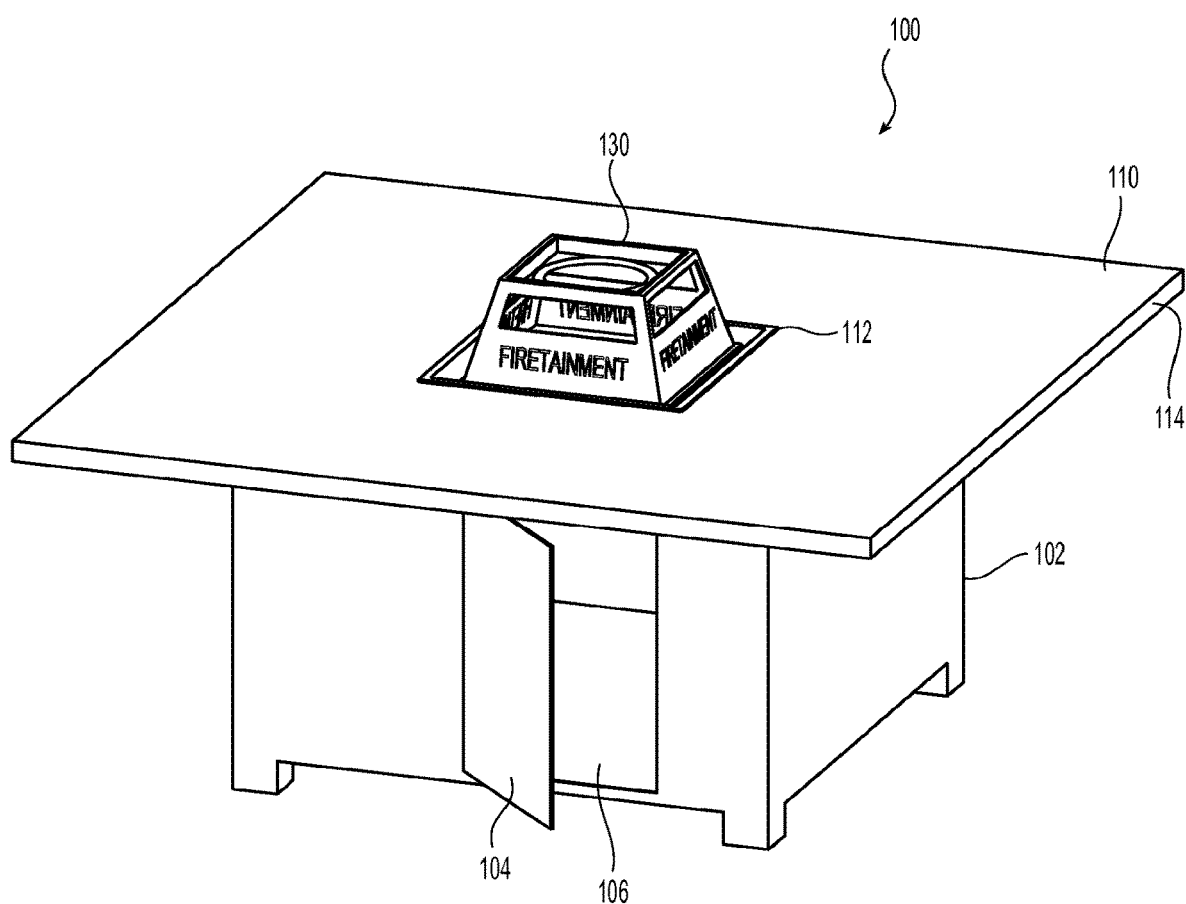
FIG. 1 is a perspective view of a fire table with a removable cooking mount according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Figure 2:
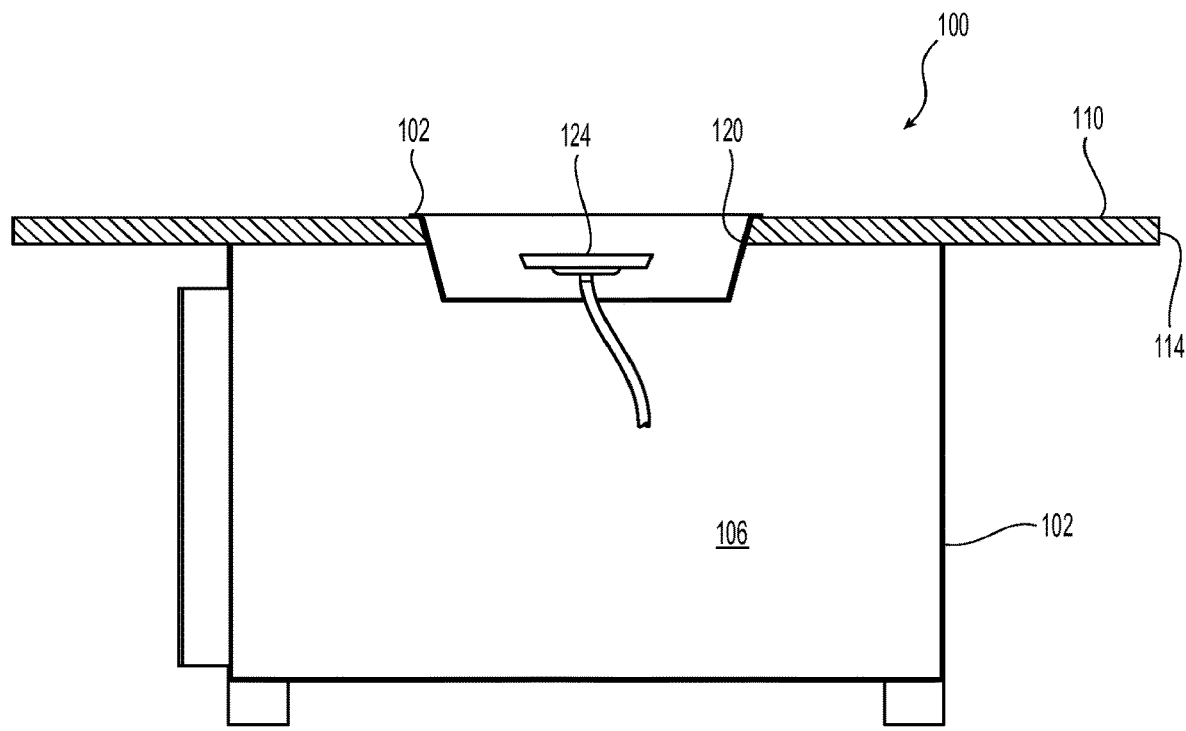
FIG. 2 is a cross sectional view of the fire table of FIG. 1.

Referring to FIGS. 1 and 2, a fire table 100 is illustrated. The fire table 100 has a base 102 that is illustrated as having a square configuration. The base 102 may be of any appropriate configuration, including, for example, rectangular, round, hexagonal and/or oval. The base 102 preferably has a door 104 or other opening to reveal a storage space 106 within the base 102. Alternatively, the storage space 106 does not need to have a door 104 but the storage space could be open without a covering and still be within the scope of the present invention. The storage space 106 can be used to store and hide a fuel source, such as LP, methane, etc. (not shown), and the cooking implements noted in more detail below. If the user wanted to cover the fire table 100 during non-use, a cover could also be stored within the storage space 106. The base 102 can be made from a variety of materials, including, for example, aluminum, steel, wood, composite materials, concrete and stone.

The fire table 100 also has a top 110 mounted to the base 102, the top 110 having an opening 112 in the top 110 to allow for the functional part of the fire table 100 to work. The top 110 is illustrated as being square, but it could have any appropriate shape. Those shapes include, for example, rectangular, round, hexagonal and oval. While for aesthetic purposes, it would be best to have the shape of the top 110 be the same as the base 102, they may have very different shapes. The opening 112 in top 110 preferably has the same shape as the top 110, but again they may be different depending on the user's own tastes and configurations of the components placed in the opening 112.

The top 110 may be made of any of a number of appropriate materials, including but not limited to natural stone, aluminum, stainless steel, concrete, and glass. The top 110 may be chosen to match the user's tastes and surrounding decor so that the fire table 100 becomes a part of the decor and not an eyesore. The top 110 preferably has sufficient area between the outside edge 114 and the opening 112 to be usable as a table top. The actual size of the top 110 may depend on any planned use as well as the number of people who may be attempting to sit around the fire table 100 comfortably.

In the opening 112 is a pan 120 that is used to hold the burner assembly 124 and the filler material 122. See FIG. 4. The pan 120 is made of stainless steel and may be made to fit within the opening 112 in the top 110. The pan 120 may also have a powder coat finish of most any color and will help to protect the pan 120.

The filler material 122 (see FIG. 4) is used to hide the burner assembly and to provide for a more aesthetically pleasing view of the fire table 100. The filler material 122 is also used to prevent the removable cooking mount 130 (FIG. 3) from sliding around in the pan 120 as discussed in more detail below. The filler material 122 may be stones or glass (generally glass beads).

Figure 3:
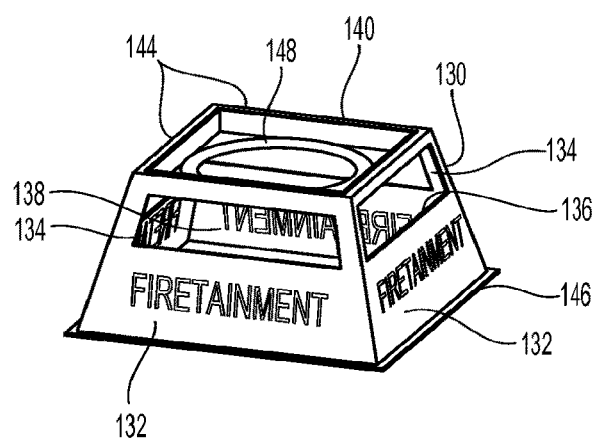
FIG. 3 is a perspective view of one embodiment of a removable cooking mount according to the present invention.
Figure 4:
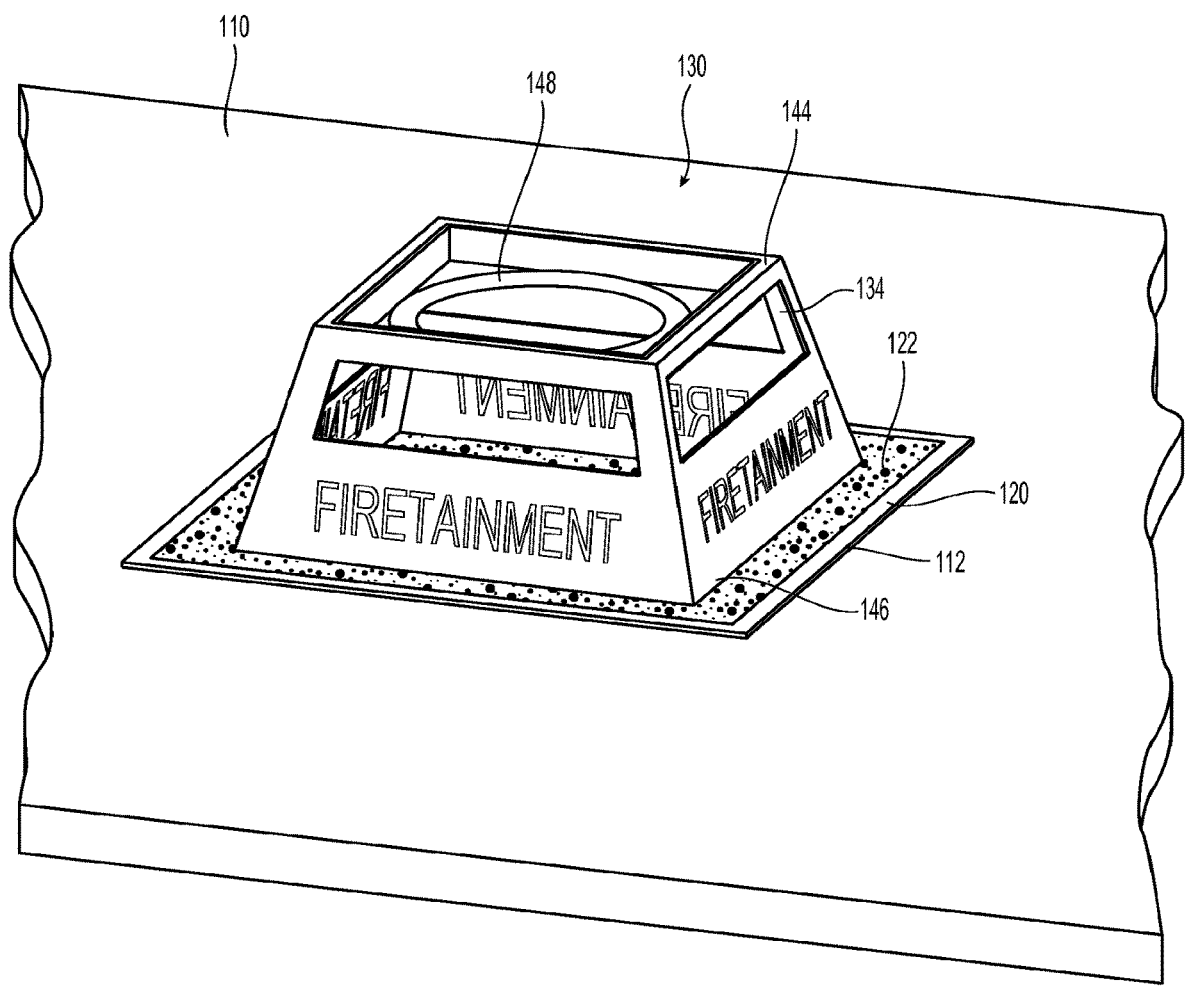
FIG. 4 is a close perspective view of the removable cooking mount of FIG. 3.
Figure 4A:
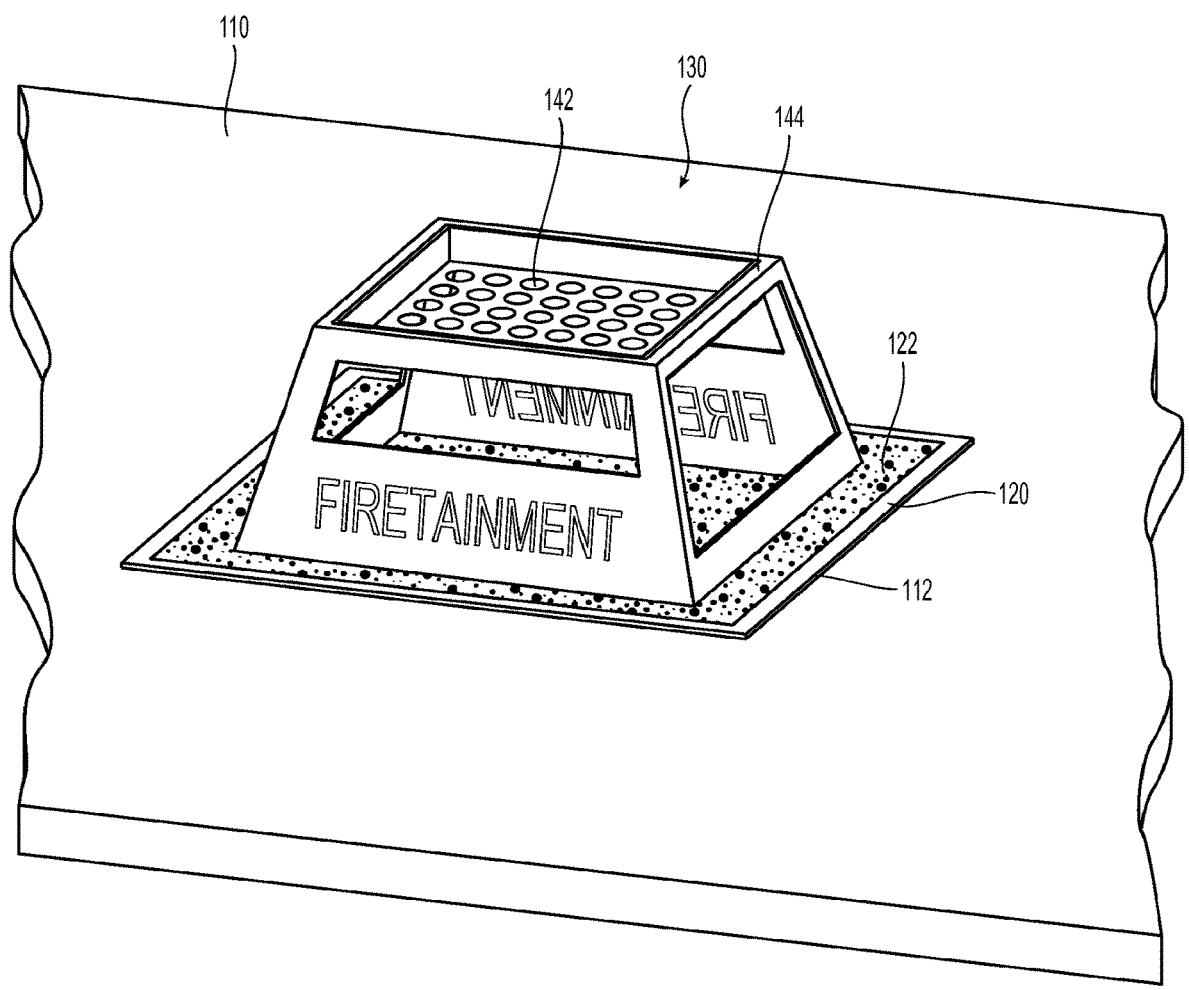
FIG. 4A is an perspective view of an alternative embodiment of a removable cooking mount according to the present invention.
Figure 5:
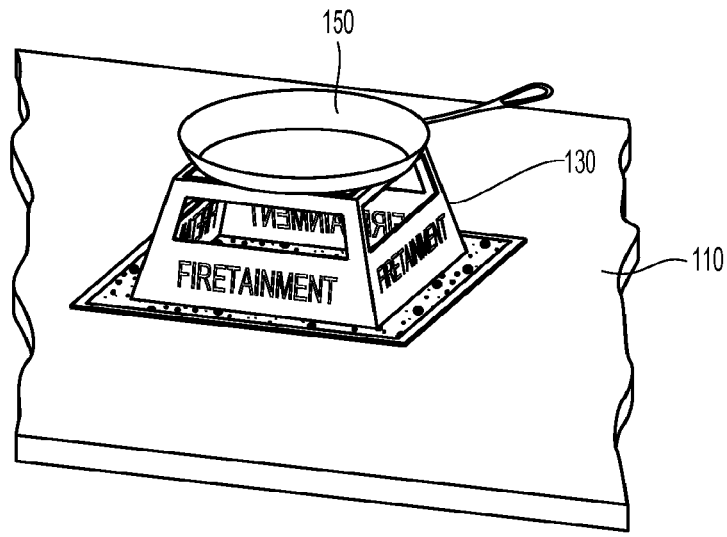
FIG. 5 is a partial perspective view of the fire table of FIG. 1 with a griddle on the removable cooking mount.
Figure 6:
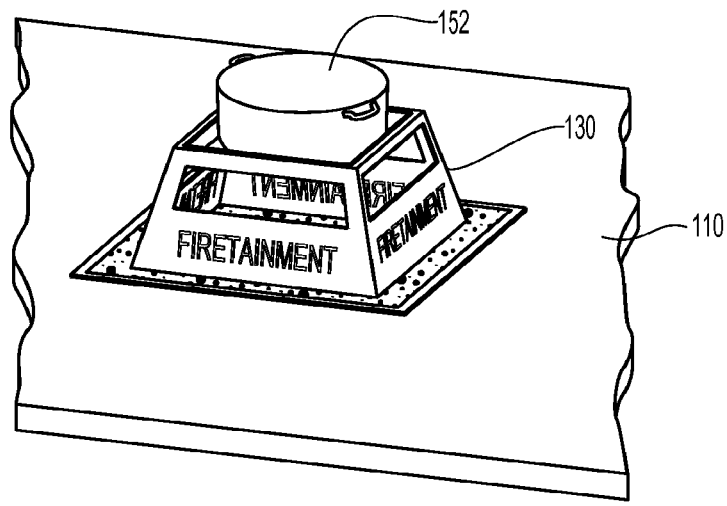
FIG. 6 is a partial perspective view of the fire table of FIG. 1 with a dutch oven on the removable cooking mount.
Figure 7:
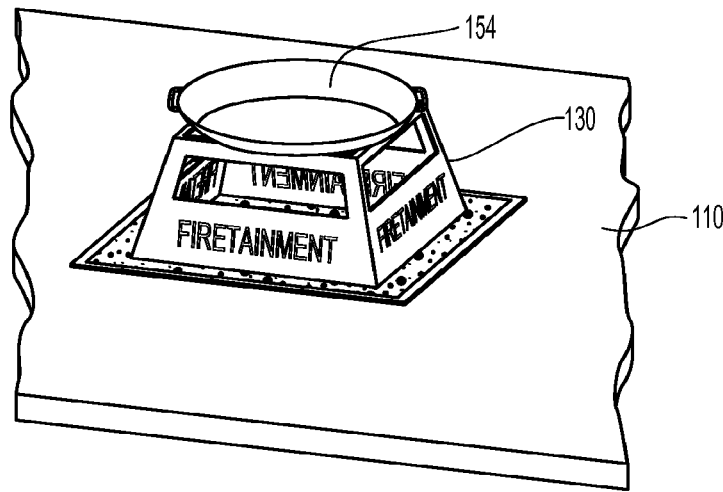
FIG. 7 is a partial perspective view of the fire table of FIG. 1 with a wok on the removable cooking mount.
Figure 8:
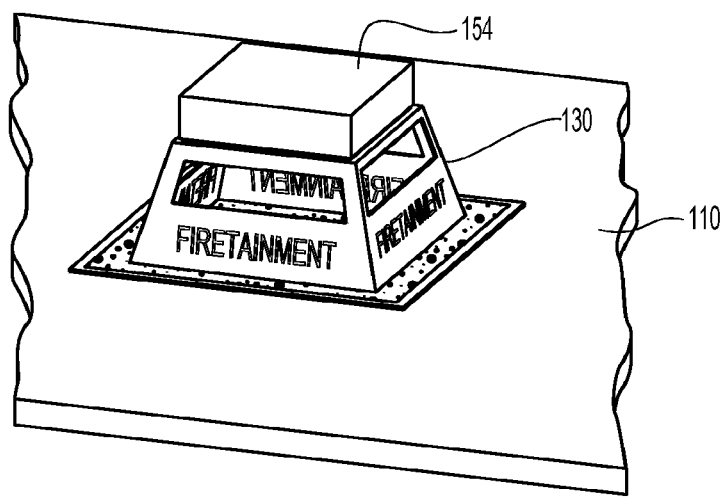
FIG. 8 is a partial perspective view of the fire table of FIG. 1 with a salt block on the removable cooking mount.

One embodiment of a removable cooking mount 130 according to the present invention is illustrated in FIGS. 3 and 4. The cooking mount 130 preferably has four sides 132, each of the four sides having an opening 134 therein to allow air to flow and feed a flame from the burner assembly. However, there could be more or fewer sides and still fall within the scope of the present invention. The openings 134 in each of the sides 132 may be of the same or different sizes. See, e.g., FIG. 4A. The bottom 136 is preferably open to allow the flame to extend upward into a center portion 138 of the cooking mount 130. The top 140 may be open as illustrated to allow for the heat to rise fully through the removable cooking mount 130, but have a portion 148 to support cooking utensils placed on the top 140 of the cooking mount 130. As illustrated, the portion 148 is preferably a circular portion, but may be of any appropriate shape. In fact, the top 140 may be partially open (i.e., small openings 142 as illustrated in FIG. 4A or just a few openings that may be larger or smaller than illustrated in FIG. 4A), or may even be totally closed. The top 140 is preferably sized so that the top surfaces 144 will support cooking utensils as discussed in more detail below. As illustrated in FIG. 4, the bottom edges 146 are wider than the top surfaces 144 so that removable cooking mount 130 is somewhat pyramidal in shape. However, as illustrated in an alternative embodiment of a removable cooking mount 230 in FIG. 10, the top and bottom may be the same size.

The bottom edges 146 should be sized such that the removable cooking mount 130 is able to be placed in the pan 120 and the filler material 122. By placing the removable cooking mount 130 in the filler material 122, the removable cooking mount 130 will be more solid and will not move while the cooking utensils are being used and possibly cause a problem with the food being cooked.

As illustrated in FIGS. 5-8, a skillet 150, a dutch oven 152, a wok 154, and a salt slab 156, respectively, are illustrated as being a cooking utensil that is used with the removable cooking mount 130 and can be used to cook food with the flame from the fire table 100. Naturally, the removable cooking mount 130 can be removed totally and other food (for example, marshmallows or even hot dogs) could be cooked over the open flame. While some of the cooking utensils are illustrated as being within the top surfaces 144 (dutch oven 152), others may sit on top of the cooking mount 130 (wok 154 and salt slab 156). Additionally other cooking utensils not illustrated or shown could also be used with the present invention.

Figure 9:
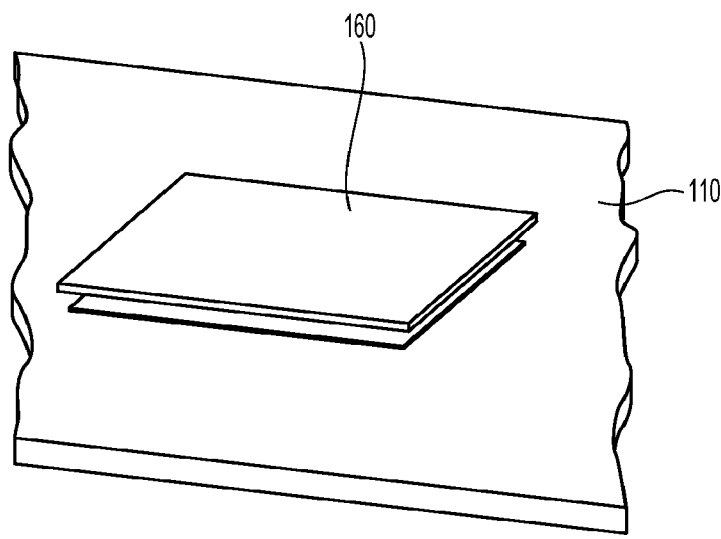
FIG. 9 is a partial perspective view of the fire table of FIG. 1 with a lazy susan in the center of the fire table with the lazy susan covering the pan.

FIG. 9 illustrates a lazy susan 160 that is placed over the pan 120 and the filler material 122 (after the fire table 100 has cooled) to allow the fire table 100 to be used more like a regular table. Again, the lazy susan 150, while illustrated as being the same configuration as the fire table 100 and the top 110 and opening 112, could have any shape. The lazy susan could also be replaced with just a cover to protect and hide the pan 120 and the filler material 122.

Figure 10:
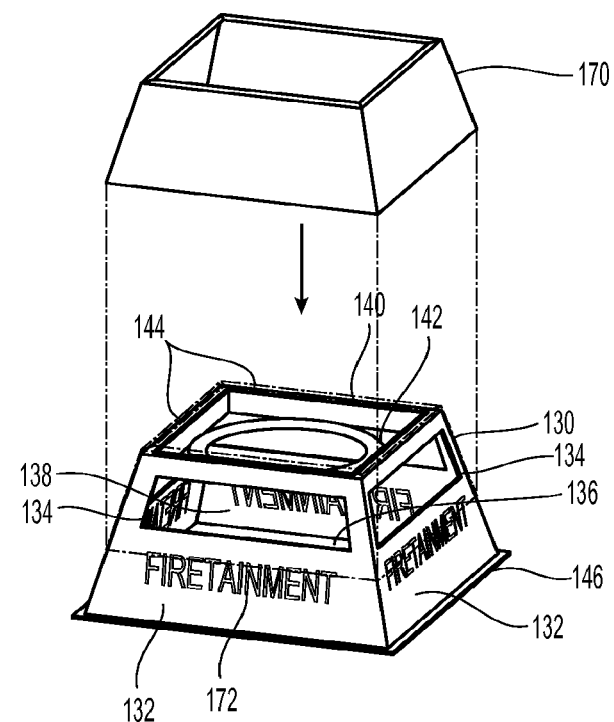
FIG. 10 is a perspective view of the removable cooking mount of FIG. 3 with a wind shield to protect the flame in the fire table.

FIG. 10 illustrates the removable cooking mount 130 with a removable wind shield 170. The removable wind 170 is configured to be placed over the removable cooking mount 130 and to cover or block the openings 134. If the firetable 100 is to be used outside and it happens to be somewhat windy, the wind could affect the flame from underneath, not heating evenly or as rapidly as needed. The removable wind shield 170 is configured the same as the upper portion of the removable cooking mount 130 so that is sits on top of the outer surface thereof. It should be noted that the removable cooking mount 130 may also have smaller openings 172 in the bottom portion of the four sides 132, which in the figures is illustrated as "FIRETAINMENT," assignee of the present application. The openings 172 allow air to get into the center portion 138 of the cooking mount 130 to provide oxygen for the flame, even when the removable wind shield 170 is in place. The openings 172 may also have other configurations, allow for personalization or simply be openings.

Figure 11:
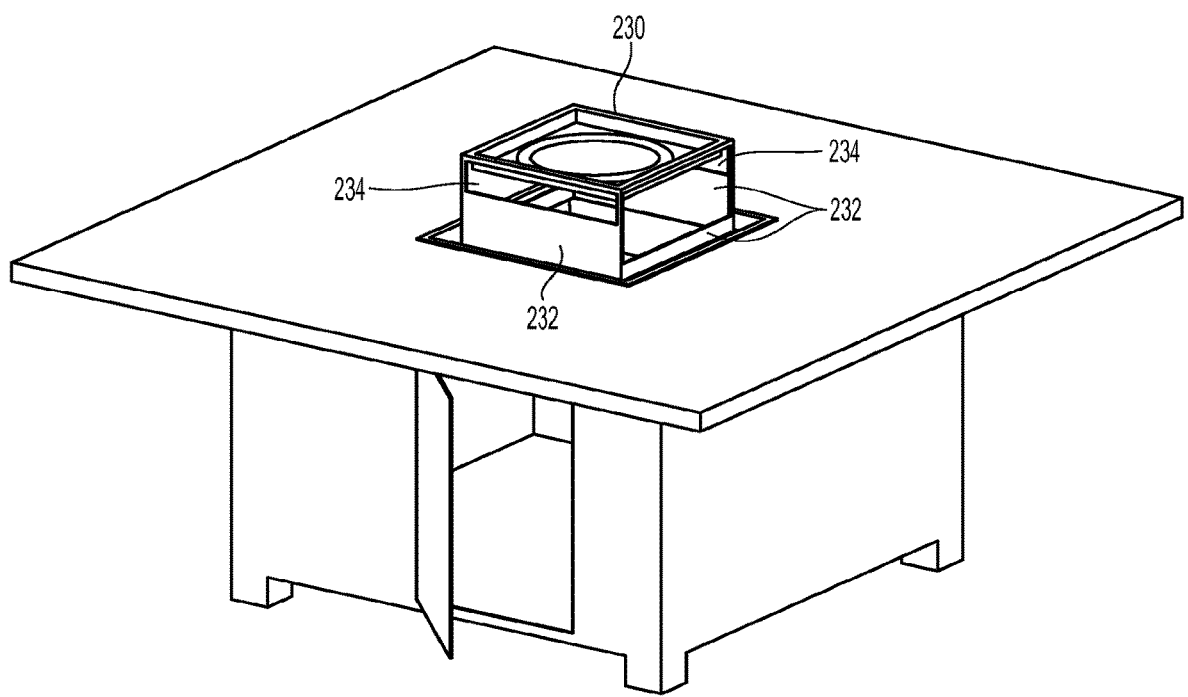
FIG. 11 is a perspective view of a fire table with another alternative embodiment of a removable cooking mount according to the present invention.

FIG. 11 illustrates an alternative embodiment of a removable cooking mount 230. The removable cooking mount 230 has four sides 232, each of the four sides 232 having an opening 234 therein to allow air to flow and feed a flame from the burner assembly. The openings 234 in each of the sides 232 are illustrated to be different sizes, but may also be the same size. The fours sides 232 are all the same size: top, bottom, and sides, making the removable cooking mount 230 a square shape, rather than the pyramidal shape of the other embodiment.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A fire table adapted to be used for cooking as well as for heat and aesthetics comprising:
    a base defining a storage space therein;
    a top mounted to and covering at least a portion of the base, the top having an upper surface and an opening therein and in communication with the storage space within the base;
    a pan disposed within the opening in the top, the pan having at least a portion thereof over the upper surface of the top and configured to hold a burner; and
    a removable cooking mount, the removable cooking mount configured to be disposed within the pan, the removable cooking mount having four sides, each of the four sides having at least one opening therein to allow air to pass from outside the removable cooking mount to fuel a fire within the pan, and openings in a top side and bottom side for access to the fire for cooking elements placed on the top side of the removable cooking mount.

2. The fire table according to claim 1, wherein the cooking elements include at least one of the elements selected from the group of a griddle, a dutch oven, a wok and a salt slab.

3. The fire table according to claim 1, wherein a fuel supply can be disposed in the storage space in the base and in fluid communication with the burner in the pan to fuel a fire within the pan.

4. The fire table according to claim 1, wherein the removable cooking mount is configured to be disposed within filler material in the pan.

5. The fire table according to claim 1, wherein the top functions as a table around the pan and cooking mount.

6. The fire table according to claim 1, further comprising a lazy susan, the lazy susan capable of being disposed in and covering at least a portion of the pan and the filler material when the fire table is being used as a table.

7. The fire table according to claim 4, wherein the filler material is glass.

8. The fire table according to claim 1, wherein the pan extends through the opening in the top and into the storage space in the base.

9. The fire table according to claim 1, wherein the top is mounted directly to the base.

* * * * *